Figure 1:
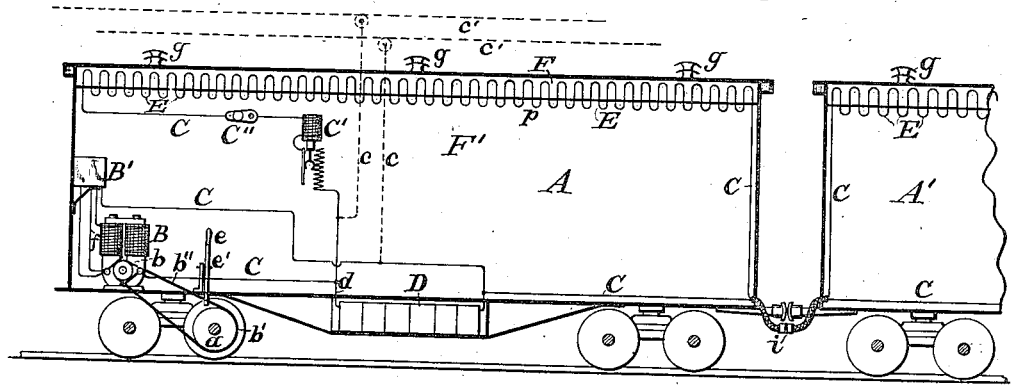

(No Model.)

M. W. DEWEY.
ELECTRIC REFRIGERATING APPARATUS FOR RAILWAY CARS.

No. 426,781. Patented Apr. 29, 1890.

WITNESSES:
C. L. Bendixon
E. Laass

INVENTOR:
Mark W. Dewey
BY
Dull, Laass & Dull
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

ELECTRIC REFRIGERATING APPARATUS FOR RAILWAY-CARS.

SPECIFICATION forming part of Letters Patent No. 426,781, dated April 29, 1890.

Application filed February 10, 1890. Serial No. 339,831. (No model.)

*To all whom it may concern:*

Be it known that I, MARK W. DEWEY, of Syracuse, in the county of Onondaga, in the State of New York, have invented new and useful Improvements in Electric Refrigerating Apparatus for Railway-Cars, (Case 51,) of which the following, taken in connection with the accompanying drawings, is a full, clear, and exact description.

My invention relates to cooling or freezing apparatus for railway-cars of any kind, but particularly refrigerator-cars, or cars to be used for the transportation of perishable goods.

The object of my invention is to electrically cool said cars or vehicles and to apply the method thereto described and shown in my prior patents, Nos. 413,136 and 420,641, dated, respectively, October 15, 1889, and February 4, 1890.

The electricity may be derived from a dynamo or battery carried on the car or from line-conductors, or both combined. When the electricity is generated by a dynamo on the car, the electric cooling apparatus is preferably in parallel or multiple-arc connection with a secondary battery, so that the latter will be charged while the car is in motion and the generator driven and supply electricity to the cooling apparatus when the car is at rest, or whenever the current from the generator is insufficient for the purpose.

It is immaterial to my invention, generally speaking, what the source of electricity may be, as is also the specific construction of the apparatus, the controlling and regulating devices therefor, and their location on the car or cars.

My invention consists, broadly, in the combination of a vehicle or car, a suitable source of electricity, an electric cooling apparatus on the vehicle in circuit with the source, and suitable controlling or regulating devices.

My invention consists, further and more specifically, in the combination, in a system of cooling cars by electricity, of a moving car, a dynamo-electric machine carried on the car and having its armature mechanically connected to the axle or wheel of the vehicle and to be driven by the latter, conductors connected to the dynamo, an electric conductor having one or more parts adapted to be cooled by a current, and a secondary battery in parallel circuit with the dynamo, and suitable current-controlling devices.

My invention consists, also, in the combination of a vehicle, a suitable source of electricity, an electric conductor on the vehicle and having parts adapted to be cooled by a current and connected to the source, a reservoir containing a medium and arranged to be cooled by the said parts, and a pipe extending from the reservoir through the interior of the car and back to said reservoir, and a pump and motor for forcing the medium through the pipe.

Figure 2:
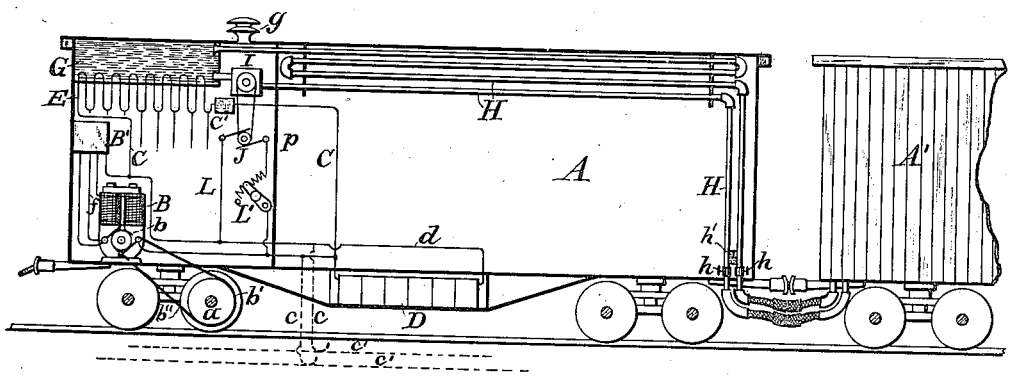

In the accompanying drawings, Figure 1 shows a sectional elevation of a refrigerator-car and a portion of another car coupled to it embodying my invention; and Fig. 2 is a modification of the same, wherein, preferably, an uncongealable medium is circulated in pipes and employed to distribute the cold (so to speak) to the apartments to be cooled in the cars.

Referring specifically to the drawings, A represents a car containing the dynamo or supply-circuit, and A' is a car coupled to it.

B is a generator of electricity or dynamo-electric machine, having a pulley $b$ on its armature-shaft connected with a pulley $b'$ on the axle $a$ of the vehicle by a belt or chain $b''$, so that the movement of the vehicle A or its axle $a$ rotates the armature of the dynamo B.

C is the supply conductor or circuit on the vehicle connected to the dynamo $c$ $c$ are electrical connections between the supply-conductor on the vehicle and line-conductors $c'$ $c'$, arranged along the path of the vehicle when line-conductors are provided. Both the connections $c$ $c$ and line-conductors $c'$ $c'$ are shown in dotted lines.

In order to provide against a possible failure of the current from the dynamo and to supply electricity during a stoppage of the car, a secondary battery or accumulator D is connected in a shunt-circuit $d$ of the supply-circuit and is charged from the latter whenever there is a surplus of current generated and discharged when the current in the supply-circuit is insufficient for the cooling apparatus.

B' indicates a box or case containing suitable well-known automatic regulating devices for the circuits or currents, and preferably consists of an automatic switch for breaking the circuit through the dynamo B when the electro-motive force of the secondary battery exceeds that of the dynamo and for closing the circuit when the electro-motive force of the dynamo exceeds that of the battery, and also consists of an automatic regulator or adjustable resistance located in the field-circuit $f$ of the dynamo to maintain a constant current in the supply-circuit C during variations in speed of the dynamo.

$e$ represents a lever on the car, pivoted at $e'$ and reaching to and on each side of the belt $b''$ to shift the latter, when desired, to a loose pulley on the axle $a$ to stop the dynamo when the current is not required.

E is the cooling apparatus or conductor having one or more parts to be cooled and one or more parts to be heated by the passage therethrough of the electric current, and is connected in the supply-circuit C, which latter includes an ordinary automatic regulator or adjustable resistance C' to control the current flowing through the cooling apparatus and a circuit-breaker C'' to open the circuit entirely when desired.

Referring to Fig. 1, F represents an apartment or space in the upper part of the car between the roof and a horizontal partition $p$ and containing the heated parts off the conductor. The apartment F is ventilated by ventilators $g$ $g$ $g$ on the roof to carry off the heat from the heated parts. The cold parts of the conductor are located in the apartment F' of the car to be cooled. It will be understood that the electric current flowing through the conductor E conducts or convects the heat from the apartment F' to the apartment F, from which it is dissipated. The cold parts located in the apartment to be cooled absorb the heat therein and conduct it through the partition to the parts called the "heated parts," from which the heat is disengaged or diffused.

In Fig. 1 the conductor in circuit containing the cooled parts is extended the entire length of the car A and is coupled by a coupling device $i$ to the circuit C on the car A', containing another conductor E. A train of cars may be thus equipped each with a cooling apparatus in a single circuit extending from car to car and arranged so that any one of the cars may be cut out of circuit without interfering with the others.

Referring to Fig. 2, the conductor E, having the cooled parts, is located only at one end of the car A and with its cold parts within a receptacle, reservoir, or tank G, containing, preferably, an uncongealable medium, as brine, which is cooled. Pipes H extend from the tank through the car A a number of times, and, when desired, to and through another car A', coupled to the former, and back to the said tank.

To maintain a rapid circulation of the medium through the pipes H, I provide a suitable pump I and an electric motor J to operate the pump. The said motor is in a shunt-circuit L of the conductor C and is regulated by the current-regulator L'. The pipes or circulatory apparatus H are arranged so that the car A' may be uncoupled from car A without breaking the circuit of the pipes, and is effected by closing the cocks $h$ $h$ and opening the cock $h'$ to open a passage from one pipe to the other, and thus complete the pipe-circuit on the car A.

The apartment F in this case is separated from the apartment F' by a perpendicular partition $p$, and said apartment F is ventilated by a suitable ventilator $g$ in the roof of the car.

Any other manner of mechanically connecting the armature with a wheel or axle of the vehicle may be substituted, as may any equivalent means whereby the dynamo is driven from the source of energy propelling the vehicle.

Regulating and controlling devices for the operation of the dynamo and control of the electric current may be used with my invention, if desired, the same or similar to the regulating devices shown and described in United States Patents Nos. 410,586 and 411,301, or any other suitable and well-known regulating devices may be employed, and I would therefore have it understood that I do not limit myself to the devices herein shown or described.

Having described my invention, what I claim as new, and desire to secure by Letters Patent, is—

1. In a system of cooling cars by electricity, the combination of a moving car, a dynamo-electric machine carried on the car and having its armature mechanically connected to the axle or wheel of the vehicle and to be driven by the latter, conductors connected to the dynamo, an electric conductor having one or more parts adapted to be cooled by a current, and a secondary battery in parallel circuit with the dynamo, and suitable current-controlling devices.

2. In a system of cooling cars by electricity, the combination of a moving car, a generator of electricity arranged to be driven by the movement of said car, an electric conductor having one or more parts adapted to be cooled by a current, and a secondary battery in parallel circuit with the generator, and suitable current-controlling devices.

3. In a system of cooling vehicles by electricity, the combination of a moving vehicle, a generator of electricity on the vehicle and arranged to be driven when the vehicle is in motion, an electric conductor having one or more parts adapted to be cooled by a current and in circuit with the generator, and suitable controlling devices.

4. In a system of cooling cars by electricity, the combination of a plurality of cars coupled together, an electric supply-conductor on one of said cars, and cooling or freezing apparatus carried on two or more of said cars and connected to the supply-conductor.

5. The combination of a moving vehicle, a generator of electricity driven by the vehicle, and an electric cooling or freezing apparatus to cool said vehicle and in circuit with the generator.

6. The combination of a vehicle, a suitable source of electricity, and an electric cooling apparatus on the vehicle in circuit with the source.

7. The combination of a vehicle, a source of electricity, an electric cooling apparatus to cool said vehicle, a secondary battery to accumulate a portion of the current from the source, and electric circuits including said cooling apparatus and battery in multiple-arc connection.

8. The combination of a vehicle, a source of electricity, an electric cooling apparatus to cool said vehicle, and a secondary battery to accumulate a portion of the electric energy from the source and in electrical connection with the latter.

9. The combination of a vehicle, a suitable source of electricity, an electric cooling apparatus on the vehicle in circuit with the source, and suitable controlling or regulating devices.

10. The combination of a vehicle, a suitable source of electricity, an electric conductor on the vehicle and having parts adapted to be cooled by a current and connected to the source, a reservoir containing a medium and arranged to be cooled by the said parts, and a pipe extending from the reservoir through the interior of the car and back to said reservoir.

11. The combination of a vehicle, a suitable source of electricity, an electric conductor on the vehicle and having parts adapted to be cooled by a current and connected to the source, a reservoir containing a medium and arranged to be cooled by the said parts, and a pipe extending from the reservoir through the interior of the car and back to said reservoir, and means for circulating the medium through the pipe.

12. The combination of a vehicle, a suitable source of electricity, an electric conductor on the vehicle and having parts adapted to be cooled by a current and connected to the source, a reservoir containing an uncongealable medium and arranged to be cooled by the said parts, and a pipe extending from the reservoir through the interior of the car and back to said reservoir, and means for circulating the medium through the pipe.

13. The combination of a vehicle, a suitable source of electricity, an electric conductor on the vehicle and having parts adapted to be cooled by a current and connected to the source, a reservoir containing a medium and arranged to be cooled by the said parts, and a pipe extending from the reservoir through the interior of the car and back to said reservoir, and a pump and motor for forcing the medium through the pipe.

14. In a system of cooling cars by electricity, the combination of a plurality of moving cars coupled together, a generator of electricity driven by one of the cars, and cooling or freezing apparatus on two or more of said cars and in circuit with the generator.

15. The combination of a vehicle, a suitable source of electricity, an electric conductor on the vehicle and having parts adapted to be cooled by a current and connected to the source, a reservoir containing a medium and arranged to be cooled by the said parts, and a pipe extending from the reservoir through the interior of the car and back to said reservoir, and a pump and motor for forcing the medium through the pipe, and suitable controlling or regulating devices.

16. The combination of a vehicle, a suitable source of electricity, an electric conductor on the vehicle and having parts adapted to be cooled and other parts adapted to be heated by a current and connected to the source, an apartment on the vehicle to be cooled by the cooled parts of the conductor, and a ventilated apartment on the vehicle containing the heated parts of the conductor.

17. The combination of a vehicle, a generator of electricity on the vehicle and driven by the movement of the vehicle, an electric conductor on the vehicle and having parts adapted to be cooled and other parts adapted to be heated by a current from the generator, an apartment on the vehicle to be cooled by the cooled parts of the conductor, and a ventilated apartment on the vehicle containing the heated parts of the conductor.

18. The combination of a vehicle, a suitable source of electricity, an electric cooling apparatus on the vehicle in circuit with the source, and suitable automatic controlling or regulating devices.

19. In a system of cooling cars by electricity, the combination of a plurality of cars coupled together, an electric supply-conductor on one of said cars, an electric conductor having one or more parts adapted to be cooled by a current and connected to the supply-conductor, a reservoir containing a medium and arranged to be cooled by the said parts, pipes extending from the car containing the reservoir to one or more of the other cars, and means for circulating the medium.

20. In a system of cooling cars by electricity, the combination of a plurality of cars coupled together, an electric supply-conductor on one of said cars, an electric conductor having one or more parts adapted to be cooled by a current and connected to the supply-conductor, a reservoir containing a medium and arranged to be cooled by the said parts, and pipes extending from the car containing the reservoir to one or more of the other cars coupled thereto.

In testimony whereof I have hereunto signed my name this 7th day of February, 1890.

MARK W. DEWEY. [L. S.]

Witnesses:
C. H. DUELL,
C. L. BENDIXON.